(12) United States Patent
Büchler et al.

(10) Patent No.: US 7,170,833 B2
(45) Date of Patent: Jan. 30, 2007

(54) APPARATUS FOR SCANNING OPTICAL RECORDING MEDIA USING DPD TRACKING METHOD WITH ANALOG AND DIGITAL DELAY ELEMENTS

(75) Inventors: Christian Büchler, Villingen-Schwenningen (DE); Steffen Lehr, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/761,441

(22) Filed: Jan. 21, 2004

(65) Prior Publication Data

US 2004/0151089 A1 Aug. 5, 2004

Related U.S. Application Data

(63) Continuation of application No. 09/438,931, filed on Nov. 12, 1999, now abandoned.

(30) Foreign Application Priority Data

Nov. 13, 1998 (DE) .................................. 198 52 291

(51) Int. Cl.
*G11B 7/00* (2006.01)
(52) U.S. Cl. .................................................. 369/44.34
(58) Field of Classification Search .............. 369/44.34
See application file for complete search history.

(56) References Cited

U.S. PATENT DOCUMENTS 3,659,229 A * 4/1972 Milton ......................... 333/18
4,785,441 A * 11/1988 Tanaka et al. ............ 369/44.23
6,266,305 B1 * 7/2001 Buchler .................... 369/44.32

* cited by examiner

*Primary Examiner*—Gautman R. Patel
(74) *Attorney, Agent, or Firm*—Joseph J. Laks; Harvey D. Fried; Patricia Verlangieri

(57) ABSTRACT

The present invention relates to an apparatus for reading from and/or writing to optical recording media, which has a tracking device, a four-quadrant detector, two summation points and a phase comparator for tracking in accordance with the differential phase detection method, and also various delay elements that can be set by a control device. The object of the present invention is to propose an apparatus of this type which exhibits the best possible compensation of the error in the track error signal and thus in the tracking signal, the said error being caused on account of the lens movement. To that end, the invention provides for analogue delay elements to be arranged upstream and digital delay elements to be arranged downstream of the summation points. The present invention is suitable for apparatuses for reading from and/or writing to optical recording media, such as CD, CDI, CD-ROM, DVD, CDR and others.

18 Claims, 8 Drawing Sheets

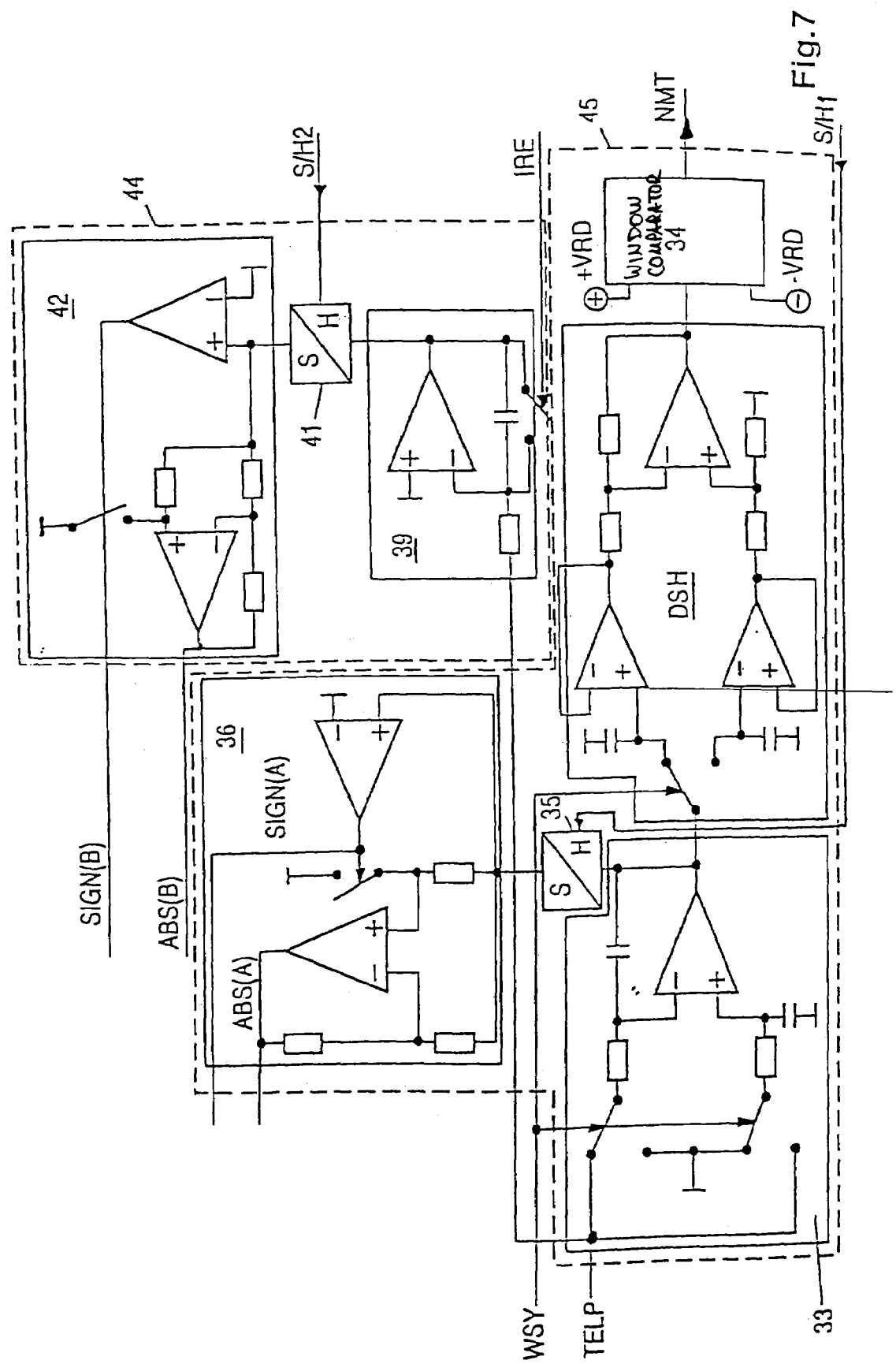

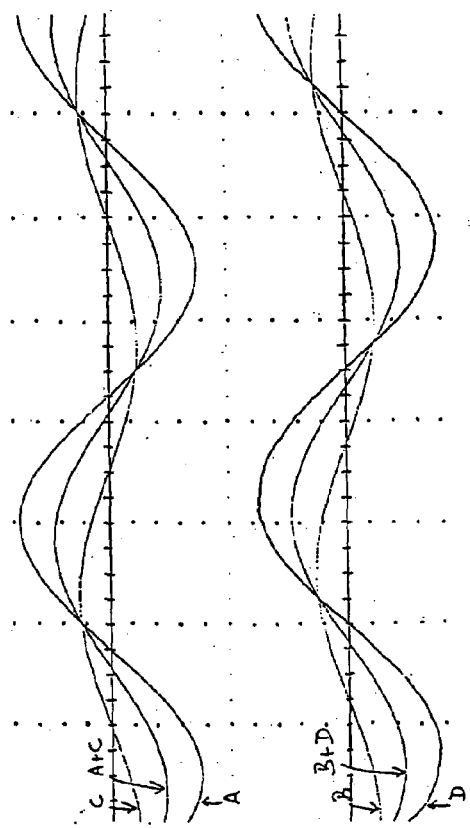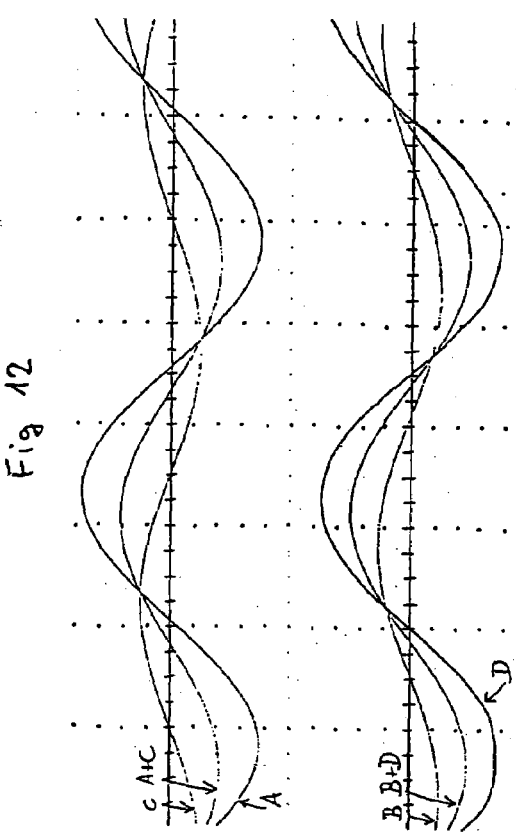
Fig 12
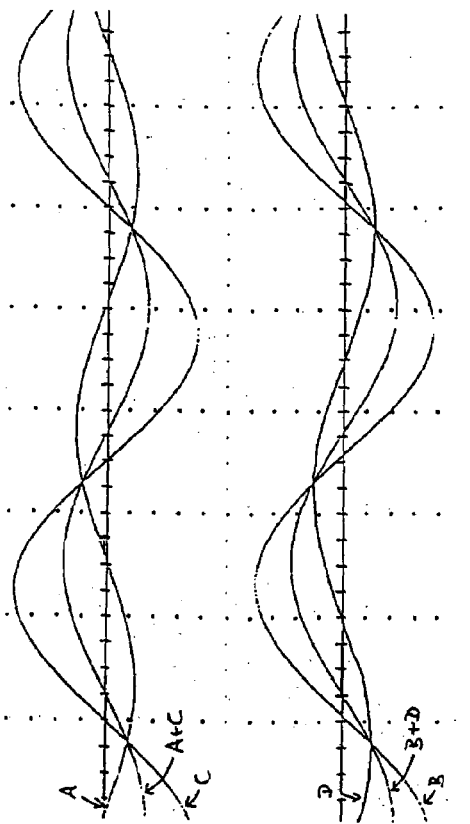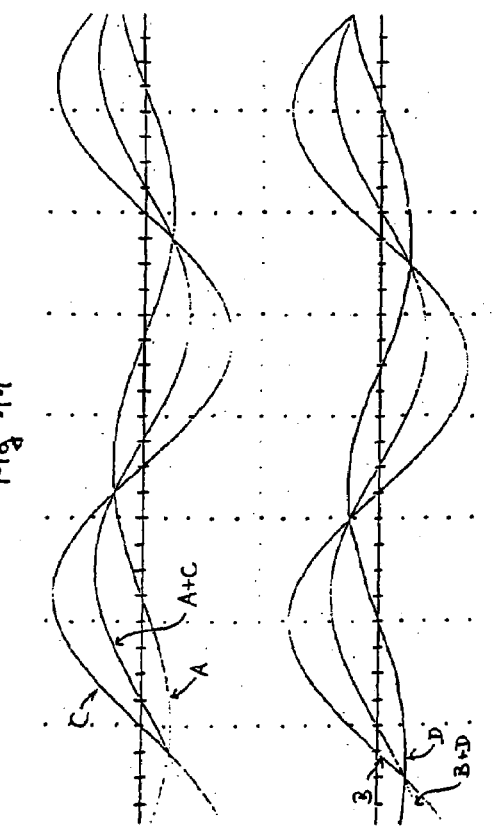
Fig 11

APPARATUS FOR SCANNING OPTICAL RECORDING MEDIA USING DPD TRACKING METHOD WITH ANALOG AND DIGITAL DELAY ELEMENTS

CROSS-REFERENCE TO RELATED APPLICATIONS

This application is a continuation of U.S. patent application Ser. No. 09/438,931, filed Nov. 12, 1999 now abandoned.

FIELD OF THE INVENTION

The present invention relates to an apparatus for reading from and/or writing to optical recording media which apparatus uses the differential phase detection method DPD for the purpose of tracking and has variable delay elements for this purpose.

BACKGROUND OF THE INVENTION

An apparatus of this type is disclosed in U.S. Pat. No. 4,785,441. In this known apparatus errors in the tracking signal, the errors being caused by tilting of the optical recording medium or by different pit depths in the optical recording medium, are compensated for by the delay times of the variable delay elements being altered on the basis of a phase comparison carried out during operation.

The known apparatus may be regarded as having the disadvantage that although errors caused by tilting of the optical recording medium or by different pit depths of the optical recording medium can be compensated for relatively well, the way in which an error caused by lens displacement is detected is not optimal. This is due to the fact that error components are included from other error sources, for example changes in the component properties which are caused by ageing or changing ambient conditions. The result of this is that the compensation is indeed not optimal.

SUMMARY OF THE INVENTION

The object of the present invention is to propose a corresponding apparatus which exhibits the best possible compensation of the error in the track error signal and thus in the tracking signal, the said error being caused on account of the lens movement.

This object is achieved according to the invention by means of the features specified in the independent claim. In this case, a portion of the variable delay elements is arranged between four-quadrant detector and summation point and designed as analogue delay element. Another portion of the variable delay elements is of digital design and arranged between summation point and phase comparator. The arrangement according to the invention has the advantage that the offset in the track error signal caused by lens movement is compensated for optimally by means of the analogue delay elements. Both phase and amplitude information of the respective analogue signal are preserved even after the delay by means of the analogue delay element and are available at the summation point. Following the summation, on the other hand, only the phase information is critical. In this case, according to the invention, the compensation of other influences on the offset is performed by means of digital delay elements. The advantage of this arrangement is that digital delay elements can be realized more easily since they delay only edges in their input signal by defined times. Likewise, the outlay for the delay elements which continue to be realized in analogue form is reduced since their required range of adjustment can be limited. A theoretical possibility of realizing all of the delay elements in digital form has proved to be less suitable in practice since both the temporal position of the signals with respect to one another and their amplitudes are important before the summation point. It has been shown in practice that both the amplitudes and the temporal behaviour of the four detector signals may vary in the event of a displacement of the objective lens from the optical axis. The compensation of that component of the track error signal offset which is dependent on lens movement can be carried out optimally according to the invention if both measurement variables are present before the summation and digitization. The amplitude information is lost, however, if digitization is already effected before the addition. Lens movement compensation would no longer be possible in an optimal manner in this case. The arrangement of variable delay elements situated upstream and downstream of the summation point makes it possible, moreover, not only to compensate for an error caused by lens deflection but also to compensate for an offset in the track error signal. Adaptations, for example to undesirable delays caused by component tolerances or to similar interfering influences, are also made possible.

According to an advantageous refinement of the apparatus, the control device has an offset determining device, at whose input the output signal of the phase comparator is present and whose output signal serves for setting the variable delay elements. This has the advantage that an offset that may be present in the track error signal is likewise compensated for by the setting of the delay times of the delay elements. In an advantageous manner, the track error signal is integrated for this purpose and the pair of detector elements to be delayed and also the magnitude of the required delay are determined from the sign and absolute value of the output signal of the integrator.

In an advantageous manner, the two error compensation devices for offset and for errors caused by lens deflection are combined in order to be able to generate a track error signal that is as free from errors as possible.

The arrangement, provided according to the invention, of at least one of the delay elements between a summation point for output signals of the detector elements of the four-quadrant detector and the phase comparator has the advantage that the offset compensation is effected with delay elements that are independent of the compensation of the lens movement. In this case, the invention provides both solutions using two variable delay elements and a simple switching device and solutions using a single delay element and a somewhat more complex switching device. This has the advantage that, depending on the given boundary conditions, it is possible to realize the most favourable version in each case in terms of cost or from the standpoint of production complexity. In general, solutions using a small number of delay elements are preferable here since they occupy a small chip area in case of realization as an integrated circuit.

A possibility of managing with just two analogue variable delay elements as afforded by the invention consists in connecting the said delay elements by means of a switching device in each case to the detector elements whose signals are to be delayed. This has the advantage that the number of delay elements is reduced in this case, too.

According to the invention, an artificial interference signal is fed to the tracking device, the track error signal caused as a result of this is compared with the interference signal and the result is fed to the control device. This has the advantage that errors in the track error signal which are caused by lens deflection can be optimally compensated for. The interference signal generating device effects a deflection of the lens and thus an error in the track error signal, the output signal of the phase comparator. This error is not compensated for as long as the tracking regulating circuit is not closed. Thus, an error caused by the lens deflection initially manifests itself without any compensation in the track error signal. By means of the control device, the interference signal and the track error signal are compared and the delay times of the variable delay elements are set optimally by means of the result of this comparison. This means that after the setting the interference signal has no residual influence, or only a very weak one, remaining in the track error signal.

The control device advantageously has a comparison device, at whose inputs the output signal of the phase comparator and the output signal of the interference signal generating device are present, the output signal of the comparison device serving for setting the variable delay elements. This has the advantage that the comparison device provides both a direction signal, which specifies whether the delay to be set has to be positive or negative, or which pair of detector elements is to be delayed, and an absolute value signal, which specifies the magnitude of the required delay. The comparison device advantageously has a synchronous demodulator.

The invention furthermore provides for an output signal of the control device to be decomposed into absolute value and sign by means of a circuit block. This has the advantage that for example the sign signal can be used directly for driving a switching device, which thus receives a quasi-digital drive signal of defined amplitude. Furthermore, sign determination e.g. in the case of the delay elements is thereby rendered unnecessary.

According to the invention, a comparator, also referred to as converter below, is connected upstream of the digital delay element or elements. The said comparator converts its analogue input signal, which is defined only within wide limits in terms of zero point and amplitude, into an output signal which assumes just two states and has relatively sharply defined transitions between these states. In this case, the comparison value of the comparator may assume a predetermined value or be tracked adaptively. The digitized signal can be processed particularly well by digital delay elements. The converter is also often referred to as "slicer".

An advantageous refinement of the invention provides for the delay elements and the control device to be realized on an integrated circuit. One advantage of the arrangement according to the invention is that inexpensive realizability is possible in case of integration in an integrated circuit since digital delay elements take up a relatively small chip area and, consequently, a low price is possible. A further advantage resides in the fact that the delay elements used are relatively small and less dependent on manufacturing tolerances of the integrated circuit.

It is understood that the invention is not restricted to the concretely specified exemplary embodiments and alternatives but rather includes all developments which are within the ability of the person skilled in the art. Further advantages and also advantageous refinements of the invention can be gathered from the following description of exemplary embodiments with reference to the drawings.

BRIEF DESCRIPTION OF THE DRAWINGS

FIG. 7 shows one embodiment of the control device, FIG. 11 shows signals of the detector elements A to D and also summation signals with deflection of the objective lens, FIG. 12 shows signals of the detector elements A to D and also summation signals with deflection of the objective lens.

DETAILED DESCRIPTION OF THE DRAWINGS

Figure 1:
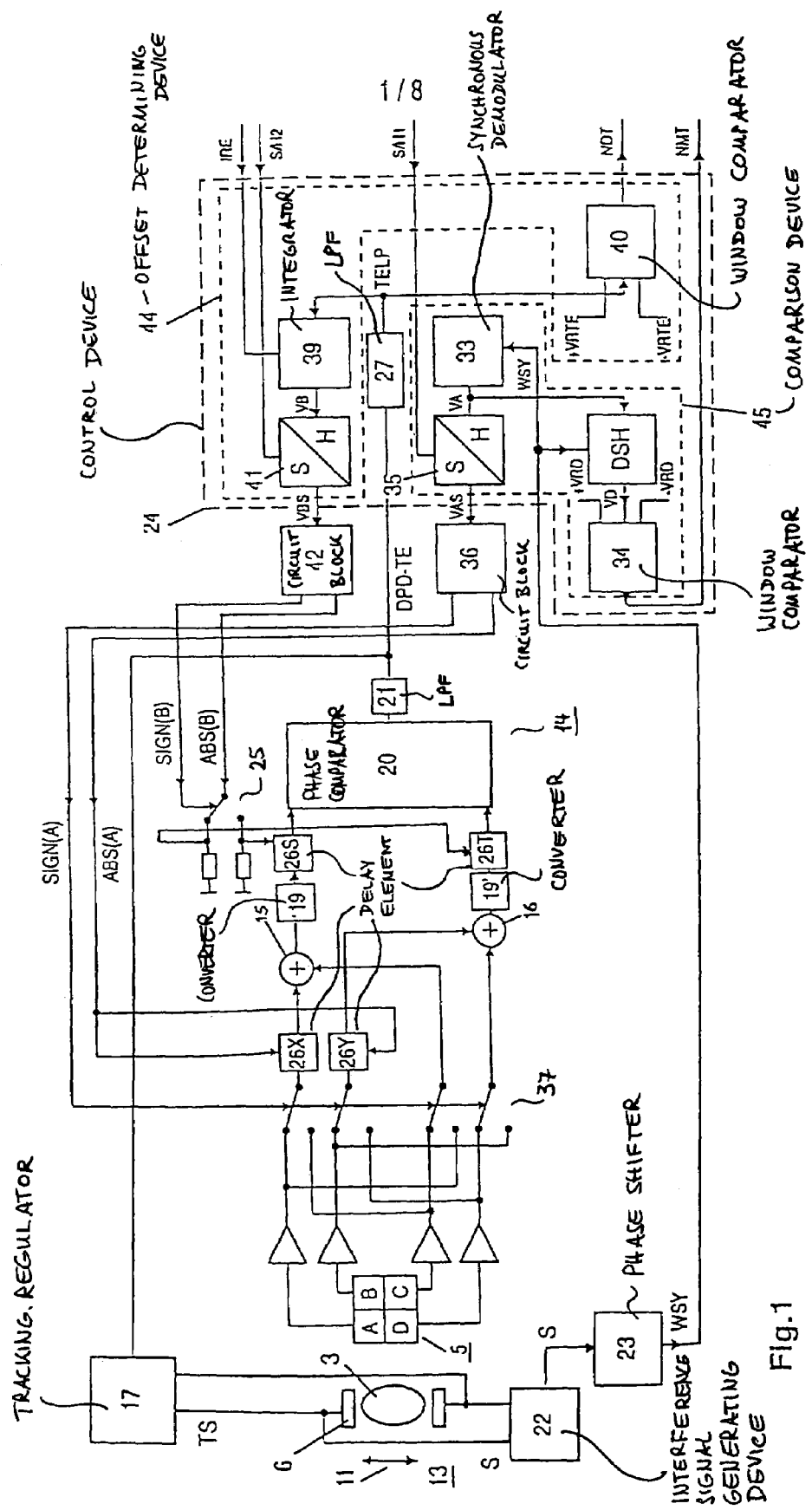
FIG. 1 shows an exemplary embodiment of an apparatus according to the invention.

FIG. 1 shows an apparatus according to the invention. A tracking device 13 is illustrated on the left-hand side, an objective lens 3 and a vernier drive 6 belonging to the said tracking device. The vernier drive 6 is driven by the tracking regulator 17, at whose input the track error signal DPD-TE output by a phase detector 14 is present. On the other hand, an interference signal S is applied to the vernier drive 6 by an interference signal generating device 22. The interference signal S is phase-shifted to form the signal WSY by means of a phase shifter 23 and fed to a control device 24. The control device 24 evaluates the signal WSY and the track error signal DPD-TE and sets the delay times $\tau_S$, $\tau_T$, $\tau_X$ and $\tau_Y$ of the variable delay elements 26S, 26T, 26X, 26Y via switching devices 25, 37. The variable analogue delay elements 26X, 26Y delay the signals output by the detector elements A and B and respectively C and D of the four-quadrant detector 5 by the respectively set delay times $\tau_X$, $\tau_Y$. The signals of the detector elements A and C, one of which is delayed, are summed at a first summation point 15 and forwarded to the phase detector 14. The same applies correspondingly to the summation point 16 and the signals of the detector elements B and D, one of which is likewise delayed.

Figure 2:
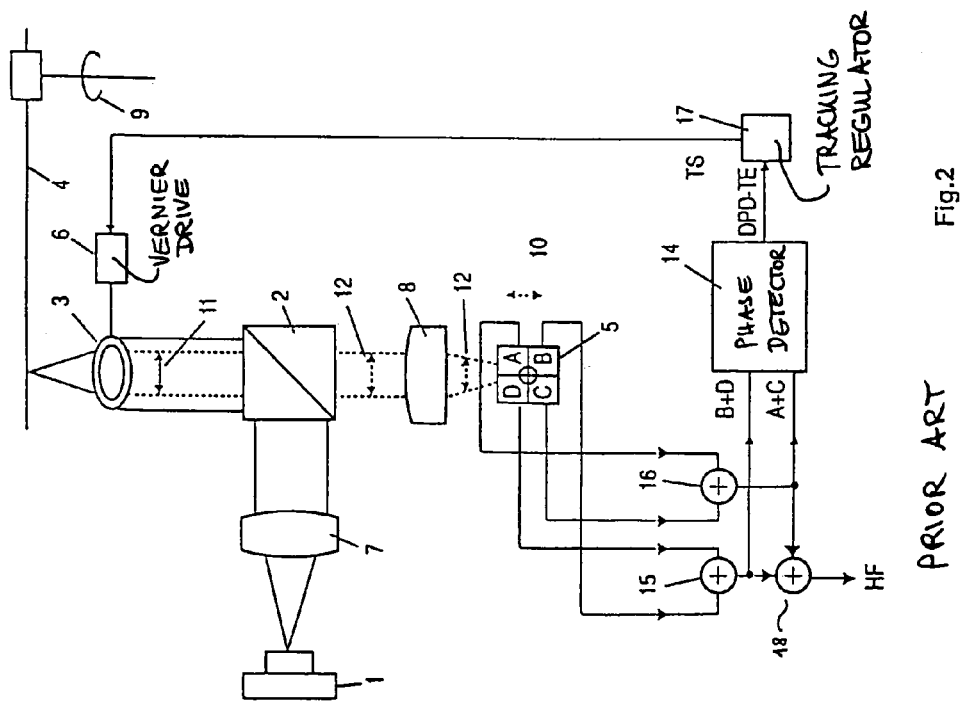
FIG. 2 shows an apparatus which utilizes the DPD tracking method.

The DPD tracking method will now be explained with reference to FIG. 2. FIG. 2 shows, in a diagrammatic illustration, a known apparatus which utilizes the DPD tracking method. A light source 1 generates a light beam which is focused onto an optical recording medium 4 by means of a semi-transparent mirror 2, which is illustrated as part of a polarizing beam splitter, and an objective lens 3. The light beam is reflected from the said optical recording medium and directed onto a four-quadrant detector 5. The four-quadrant detector 5 is shown tilted by 90°, that is to say in plan view, and comprises four detector elements A, B, C and D. Arrow 10 indicates the track direction, that is to say the direction in which the recording medium 4 moves relative to the four-quadrant detector 5. The four-quadrant detector 5 can thus be divided into two detector areas which are situated laterally with respect to the track direction and comprise the detector elements A and B, on the one hand and also C and D, on the other hand.

A collimator 7 is arranged between light source 1 and mirror 2, and a convex lens 8 is arranged between mirror 2 and the four-quadrant detector 5. A vernier drive 6 moves the objective lens 3 in the radial direction with regard to the optical recording medium 4 in accordance with a vernier drive actuating signal TS. Objective lens 3 and vernier drive 6 are part of the tracking device 13. The recording medium 4 is designed as a disc, for example corresponding to an audio compact disc (CD), a video disc, a recording medium having a high recording density (DVD) or the like. The optical recording medium 4 is made to rotate by means of a disc drive 9 (indicated only diagrammatically here). A section through the recording medium 4 along a diameter is illustrated. The light beam focused onto the recording medium 4 by the objective lens 3 is situated in the radially outer area of the recording medium 4. The displacement direction of the beam reflected from the optical recording medium 4, after passing through the objective lens 3 which is caused by the displacement of the objective lens 3 effected by the vernier drive 6, is indicated by the arrows 12. Arrow 11 represents the direction of movement of the lens 3.

The outputs of the detector elements A and C are connected to a first summation point 15, and the outputs of the detector elements B and D are connected to a second summation point 16. The corresponding summation signals A+C and B+D, respectively, are forwarded to a phase detector 14, at whose output a track error signal DPD-TE determined according to the DPD method is present.

The outputs of the summation points 15 and 16 are connected to the inputs of a further summation point 18. Thus, the sum of the signals of all the detector elements A, B, C and D is present at the output of the summation point 18. This signal is the information signal HF, which is passed on to an evaluation unit (not illustrated here) for conversion into signals that can be evaluated for the user.

In order to describe the functioning of the apparatus according to the invention, reference shall initially be made to FIG. 1. The structure of the phase detector 14 is elucidated diagrammatically here. The phase detector has the converters 19, 19', a phase comparator 20 and a low-pass filter 21. In the configuration according to the invention as shown in FIG. 1, the variable digital delay elements 26S, 26T are arranged between converter 19, 19' and phase comparator 20, the said delay elements not usually being regarded as part of a phase detector. Situated at the inputs of the phase detector 14 is a respective converter 19 and 19', whose outputs are connected to the inputs of a phase comparator 20, via the delay elements 26S, 26T in the exemplary embodiment. The output of the phase comparator 20 is connected to the output of the phase detector 14 via a low-pass filter 21, at which output the track error signal DPD-TE determined by means of the DPD method is present.

The signals of the detector elements A and C are added at the summation point 15, and the summation signal is brought to logic level in the converter 19, which acts as a zero crossing comparator. A corresponding digitized summation signal B+D is formed by means of the summation point 16 and the converter 19'. These two signals pass through a respective delay element 26S, 26T and are fed to the phase comparator 20, which evaluates the relative time interval between the edges of the two signals. The track error signal DPD-TE is the average value of these time differences and is formed by the low-pass filter 21. If the scanning point or spot 29, as explained below with reference to FIG. 3, follows the track centre 30 exactly, then the zero crossings of the summation signals A+C and B+D take place simultaneously and the resultant track error is zero. If the spot 29 follows the track with a constant deviation with respect to the track centre, then the zero crossing of these summation signals no longer occurs simultaneously but rather in a manner shifted temporally with respect to one another. The time difference that occurs is on average approximately proportional to the scanning deviation with respect to the track centre, where the time difference, referring to one of the signals, may be positive or negative. In other words, the sign of the time difference comprises the direction and the absolute value, on the other hand, the magnitude of the deviation.

In FIG. 1, the static offset adjustment is effected by the delay elements 26S, 26T, and that is to say downstream of the summation points 15, 16. A switching device 25 is switched in dependence on the signal SIGN (B) and causes the signal ABS (B) to be fed to one of the digital delay elements 26S, 26T. The delay elements 26S, 26T can thus be connected to the output signal VBS of the offset determining device 44 by means of the switching device. 25. It lies within the scope of the invention to provide a digital delay element having a fixed delay time and a variable digital delay element instead of two variable delay elements 26S, 26T at this point, the delay time of the said variable digital delay element being shortened or lengthened in comparison with the fixed delay time of the other delay element in dependence on the signal VBS.

Two variable analogue delay elements 26X and 26Y, which can be connected either to the detector elements A and B or to the detector elements C and D by means of a switching device 37, are provided for the purpose of adjusting the error caused by lens movement. This ensures that either the signals of one pair A-B or those of the other pair C-D are delayed relative to the respective other pair. The switching device 37 is switched by means of the signal SIGN (A), and the signal ABS (A) is applied to the delay elements 26X, 26Y.

Figure 3:
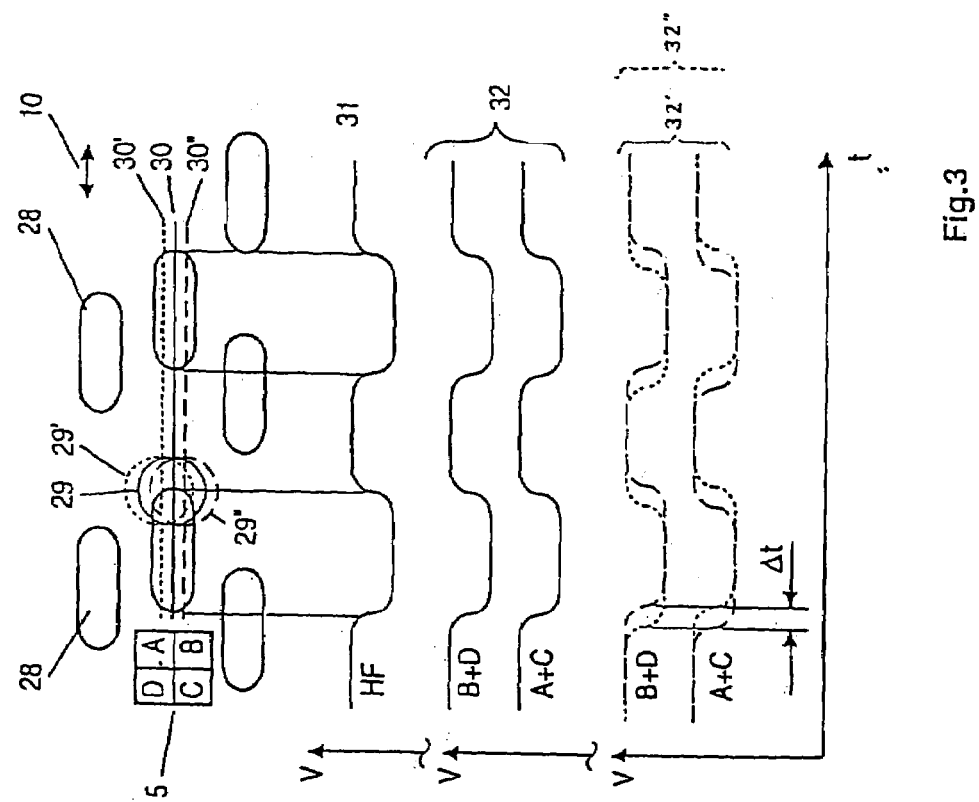
FIG. 3 shows the phase relationship of the individual detector signals in case of application of the DPD tracking method.

In its upper part, FIG. 3 shows a diagrammatic, greatly enlarged detail of the information layer of the optical recording medium 4 in plan view. Three tracks lying next to one another are evident, of which two or three of the depressions, the so-called pits 28, that form them and are extended in elongate fashion in the track direction are illustrated. The distances between the pits 28 in the track direction as well as the length of the pits in the track direction (arrow 10) can differ within specific limits from the conditions shown here. This depends on the modulation method used for converting the information to be stored into the pit pattern and on the content of the recorded information. In particular, the pits 28 can have different lengths.

A four-quadrant detector 5, which is situated symmetrically with respect to the track centre 30 of the central track and comprises the detector elements A, B, C and D, is indicated to the left of the pits 28.

This serves to illustrate how the output signals of the detector areas A, B, C and D behave when the light spot 29 falling onto the information layer is displaced from the track centre 30.

In the lower region of FIG. 3, the amplitudes of a number of combinations of the output signals of the detector areas A, B, C and D are plotted diagrammatically against the time axis t, where the time axis t corresponds to the space axis in the track direction in the event of a movement of spot 29 and optical recording medium in the track direction (arrow 10) relative to one another at a normal read-out speed. In the following text, for the sake of simplicity, the signals of the detector areas A, B, C, D and signals derived therefrom are in some instances also designated by the letters of the detector elements.

The curve 31 illustrated directly below the pits 28 diagrammatically shows the information signal HF, that is to say the sum of the signals of all the detector elements A, B, C and D. As long as the spot 29 does not impinge on any of the pits 28, the amplitude of the information signal HF is large. As soon as the spot 29 moves onto one of the pits 28, the amplitude decreases as a consequence of destructive interference, changed reflectivity or on account of another suitable effect, and reaches a minimum as soon as maximum overlapping of spot 29 and pit 28 is reached.

The curves 32 show a combination of the already digitized signals A+C and B+D without track errors, that is to say when the spot 29 is centred with respect to the track centre 30 or when there is no deflection of the objective lens 3. The curves 32Δ (dotted) and the curves 32" (dashed) respectively show the temporal shift of the summation signals A+C and B+D in dependence on the lens displacement or the deviation of the spot 29' and of the spot 29", respectively, from the track centre 30 in the direction of the displaced scanning track 30' and 30" respectively. Since both a deviation from the track centre and a lens displacement leads to the same result in the digital summation signal, the two dependencies cannot be separated. The temporal shift Δt of the signals A+C and B+D with respect to one another corresponds, in terms of its absolute value, to the magnitude of the deviation of the displaced scanning track 30'. 30" from the track centre 30 and, in terms of its sign, to the direction of the corresponding deviation. The phase detector 14 determines the track error signal DPD-TE therefrom—as described above.

It may be noted that, depending on the optical construction the signals of the detector areas A, B, C and D may already have temporally static shifts with respect to one another in the absence of track deviation or lens deflection. However, the shifts of B+D in comparison with A+C which are shown in the curves 32' and 32" are typical in case of lens deflection or deviation from the track centre.

Since the objective lens 3 has to be able to move in the horizontal direction, that is to say perpendicularly to the direction of the tracks of the recording medium 4, drifting of the reflective imaging of the disc information surface on the four-quadrant detector 5 is likewise produced in the event of deflection in the horizontal direction on account of the beam geometry. It is therefore a particular property of the DPD tracking method that as a result of these time differences on account of the lens movement a track error signal DPD-TE arises which is not zero even if the spot 29 follows the track centre 30 exactly.

Subjecting the signal of one or more detector elements A, B, C and D to a time delay in a targeted manner before their addition at the summation points 15 and 16, respectively, makes it possible to achieve compensation of the offset in the track error signal DPD-TE, the said offset being caused on account of the lens movement. The apparatus according to the invention and also the method according to the invention make it possible, as a result of the adjustment of the delay times $\tau_X$, $\tau_Y$, of the variable delay elements 26X, 26Y, to achieve the best possible compensation of this offset on account of the lens movement and also, in combination with the variable delay times of the digital delay elements, the best possible compensation of offsets which are based on other influences.

Figure 10:
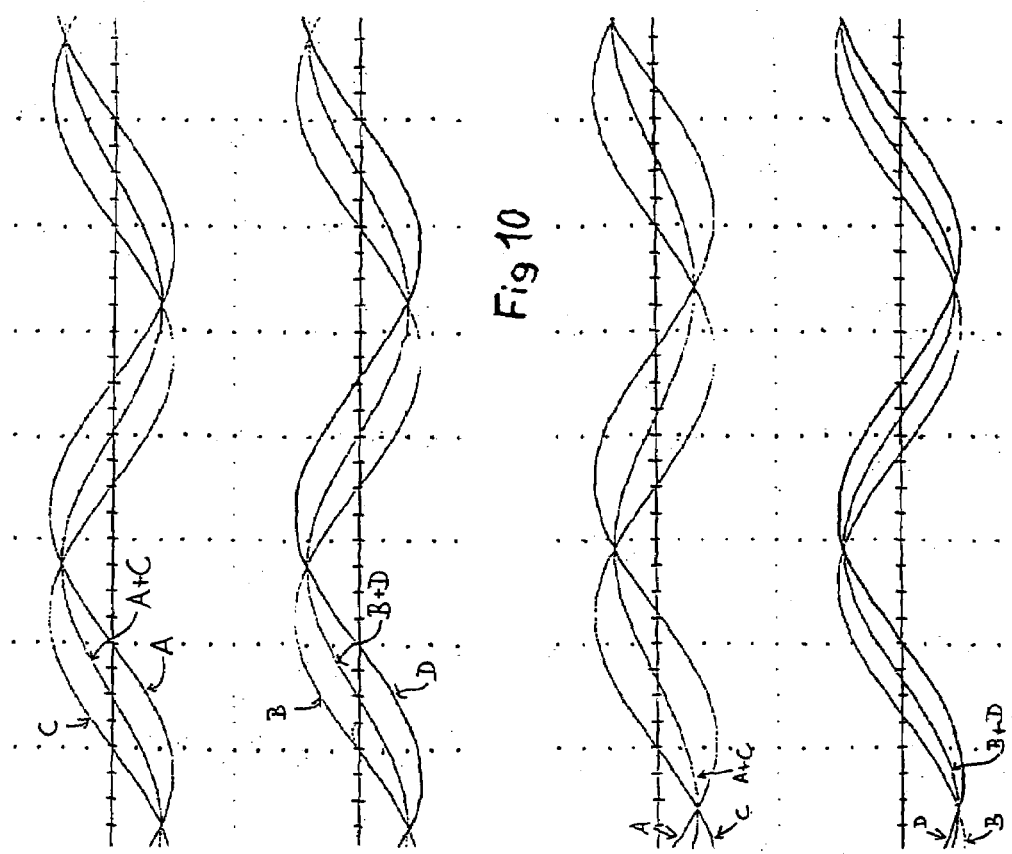
FIG. 10 shows signals of the detector elements A to D and also summation signals without deflection of the objective lens.

In its upper part, FIG. 10 shows the amplitude characteristic and the phase of the signals of the detector elements A, B, C and D and also of the summation signals A+D and B+D using the example of a so-called 3T signal without any deflection of the objective lens relative to the track and without a delay being set. The 3T signal corresponds to a short pit 28. The horizontal axes in FIG. 10 correspond to the respective zero lines, and a vertical dotted axis is indicated every 5 units in order to afford better orientation. The signals illustrated have the same amplitude; therefore, the zero crossing of the respective summation signals A+C and B+D lies in the centre between the zero crossings of the individual signals A and C and respectively B and D. The phase between the summation signals A+C and B+D is zero.

In its lower part, FIG. 10 shows the amplitude characteristic and the phase of the detector signals A, B, C and D using the example of a 3T signal without any lens movement but with compensation by means of delay. As a result of the delay, the two signals A and B are shifted by approximately 1.2 units to the right in comparison with the upper part of FIG. 10. Since the signals have the same amplitude, the zero crossing of the respective summation signals A+C and B+D lies in the centre between the zero crossings of the individual signals. The phase between the summation signals is again zero. Thus, the compensation does not interfere with the phase without lens deflection.

In its upper part, FIG. 11 shows the amplitude characteristic and the phase of the detector signals A, B, C and D using the example of a 3T signal with lens movement but without compensation by means of delay. FIG. 11 corresponds to FIG. 10 in terms of its structure. On account of the lens movement, by way of example the zero crossings of the signal A are shifted to the right, and those of the signal B to the left, in comparison with the upper part of FIG. 10. Since the signals A and C and also B and D have different amplitudes, the zero crossings of the respective summation signals A+C and B+D no longer lie in the centre between the zero crossings of the individual signals. Likewise, the phase difference between the summation signals is no longer zero but rather is approximately one unit in the example illustrated.

The lower part of FIG. 11 shows the amplitude characteristic and the phase of the detector signals A, B, C and D using the example of a 3T signal with lens movement and, in contrast to the upper part, with compensation by means of delay. The effect of the delay is that the two signals A and B are shifted by approximately 1.2 units to the right in comparison with the upper part of FIG. 11. On account of the lens movement, by way of example, the zero crossings of the signals A are shifted to the right and B to the left, this being so both in comparison with the upper part of FIG. 10 and with that of FIG. 11. The individual signals have different amplitudes; therefore, the zero crossings of the respective summation signals A+C and B+D no longer lie in the centre between the zero crossings of the individual signals. As a result of the compensation, however the phase difference between the summation signals is zero.

FIG. 12 shows the amplitude characteristic and the phase of the detector signals A, B, C and D using the example of a 3T signal with the opposite direction of lens movement to that of FIG. 11. The case without compensation by means of delay is illustrated in the upper part. On account of the lens movement in the other direction, by way of example the zero crossings of the signal A are shifted to the left, and those of the signal B to the right, in comparison with FIG. 10. When a displacement of the objective lens occurs, the signals also have a changed amplitude in addition to their phase shift. The said amplitude is different for the individual signals, for which reason the zero crossings of the respective summation signals A+C and B+D no longer lie in the centre between the zero crossings of the individual signals. Likewise, the phase between the summation signals is no longer zero but rather, in the example illustrated, is approximately one unit in the direction other than that in FIG. 11.

The corresponding signals with compensation by means of delay are illustrated in the lower part of FIG. 12. On account of the delay, the two signals A and B are shifted by approximately 1.2 units to the right in comparison with the upper part of the Figure. On account of the lens movement in the other direction, by way of example the zero crossings of the signals A are shifted to the left and B to the right in comparison with the upper part of FIG. 10, as in the upper part of FIG. 12. Since the signals have different amplitudes, the zero crossings of the respective summation signals A+C and B+D no longer lie in the centre between the zero crossings of the individual signals. As a result of the compensation, however, the phase difference between the summation signals is again zero in this case, too.

In the examples specified in FIGS. 10–12, a displacement of the light spot on the detector in the direction of the half of the detector elements B and C, in the case of which the signals B and C become larger and the signals A and D become smaller, is accompanied by a temporal shift of the zero crossing of the signal A to the right and of the signal B to the left. In the case of an opposite direction of movement of the light spot, the signals A and D become larger and the signals B and C, on the other hand, become smaller. The temporal shift of the signals A and B is likewise reversed.

The example specified constitutes just one of the possible behaviours of the individual detector signals with respect to one another; other combinations such as opposite temporal behaviour given the same displacement direction as specified in the example, effect of the temporal shift on the signals C and D instead of on the signals A and B, and others likewise occur. This depends on the construction and the tolerances of the optical system as well as the optical properties of the recording media to be played back.

As is evident from FIGS. 10 to 12, the delay of the respectively larger signal, the signal B in the upper part of FIGS. 11 and 12, effects a greater shift of the zero crossing of the sum B+D than the same delay of the smaller signal, in this case the signal A for example, with regard to the sum A+C, even though the absolute value of the shift is the same for both signals A and B. If the amplitude information were no longer available at the point of summation, then correct compensation could no longer be achieved since the interaction between amplitude and phase would be lost. The invention therefore provides an analogue delay before the summation.

The functioning of one exemplary embodiment of an apparatus according to the invention will now be described with reference to FIG. 1. As a result of the movement of the objective lens 3 parallel to the surface of the recording medium 4 perpendicularly to the track direction, that is to say in the direction of the arrow 11, an offset is formed in the track error signal DPD-TE. In accordance with one variant of the invention, the vernier drive 6 is driven by means of a sinusoidal interference signal S from the interference signal generating device 22. As a result, the objective lens 3 is moved about its mechanical zero position by a certain mechanical excursion; this is also referred to as the objective lens 3 being wobbled. The drive frequency is freely selectable within certain limits in this case. Approximately 2–10 Hz are expedient since the measurement time or integration time, as described in more detail below with regard to the control device 24, becomes too long if the frequency is too slow, and the natural resonance, not specified exactly, of the tracking device is approached if the frequency is too high. If the objective lens 3 is then deflected, modulation of the envelope of the track error signal DPD-TE occurs in the event of incorrect setting of the delay times $\tau_X$ and $\tau_Y$, respectively, of the analogue delay elements 26X and 26Y.

The tracking device 22 follows the excitation by the interference signal S with a time delay. A low-pass filter 27 with a low cut-off frequency is used to determine the modulation of the track error signal DPD-TE. Therefore, the zero crossings of the modulation on the low-frequency component, used for the evaluation, of the track error signal, of the signal TELP, are temporally shifted with respect to the zero crossings of the interference signal S. This phase shift is compensated for by means of the phase shifter 23, whose phase shift is selected such that it corresponds to the phase shift caused by the tracking device 13 and the low-pass filter 27. At the output of the phase shifter 23, a phase-shifted interference signal WSY is obtained which is also referred to below as wobble synchronization signal, which is synchronous with the modulation of the signal TELP, of the low-frequency component of the track error signal DPD-TE.

The delay times $\tau_S$, $\tau_T$, $\tau_X$ and $\tau_Y$ of the delay elements 26S, 26T, 26X and 26Y, respectively, are set under the control of the control device 24. For this purpose, the control device 24 has an offset determining device 44 and a comparison device 45. The latter contains, in the exemplary embodiment, a differential sample-and-hold circuit DSH, a synchronous demodulator 33, a first window comparator 34 and a sample-and-hold circuit 35. This is followed by a first circuit block 36.

The signal WSY and the output signal TELP of the low-pass filter 27 are fed to a synchronous demodulator 33, which forms the absolute value from the modulation of the signal TELP and integrates it. If the modulation of the signal TELP and the wobble synchronization signal WSY are in phase, then the output voltage VA rises; if these signals are in antiphase, then the output voltage VA of the synchronous demodulator 33 falls. The output voltage VA is fed, on the one hand, to a first sample-and-hold circuit 35 and, on the other hand, to a differential sample-and-hold circuit DSH, which produces a voltage VD which is proportional to the temporal change of the voltage VA. The voltage VD thus differs from zero when the output voltage VA of the synchronous demodulator 33 changes with respect to time. It is equal to zero when the output voltage VA no longer changes with respect to time. This can be ascertained with the aid of a window comparator 34 to which the comparison voltages ±VRD are applied, which may be fixedly predetermined or else, advantageously, may be adaptively matched. The output signal NMT of the said window comparator thus indicates when the track error signal DPD-TE no longer has modulation which is synchronous with the frequency of the interference signal S.

The sample-and-hold circuit 35 is firstly switched to sample, that is to say "follow voltage", VAS=VA, by a control signal S/H1 which is emitted by a controller (not illustrated). The output voltage VAS of the sample-and-hold circuit 35 is fed to a circuit block 36, which forms the absolute value ABS(A) and the sign SIGN(A) from the output voltage VAS. The sign SIGN(A) determines the pair of detector elements A and B or C and D to which the variable analogue delay elements 26X and 26Y are assigned, the delay times of which are determined by the absolute value ABS (A) of the output voltage VAS. To that end switching device 37 is controlled by the sign signal SIGN (A). The circuit functions described thus enable the delay time $\tau_X$, $\tau_Y$ of a pair of detector elements A and B or C and D to be adjusted in such a way that the lens movement-dependent modulation of the track error signal DPD-TE is compensated for. Since the delay elements 26X, 26Y are analogue components, they do not significantly influence the signal waveform of the signals which they delay, with the result that these are also still available during the summation with the respective undelayed signal at the summation point 15, 16. This greatly influences the adjustment accuracy that can be attained.

If this has been done, the voltage VAS is held by the first sample-and-hold circuit 35. There now remains only a constant offset in the track error signal DPD-TE, which can be compensated for by adjusting the delay times of the delay elements 26S, 26T. This offset adjustment is implemented with the aid of the offset determining device 44, which has an integrator 39, a window comparator 40 and a sample-and-hold circuit 41. The output thereof is followed by a second circuit block 42 in the exemplary embodiment.

For the purpose of offset adjustment, an integrator 39 and a second window comparator 40 are connected to the output of the low-pass filter 27. The second window comparator 40 determines whether the filtered track error signal TELP has a DC voltage offset that is sufficiently small. Since this is normally not the case after the 1st adjustment step, the lens movement compensation for the track error signal DPD-TE, the output voltage VB of the integrator 39 will change. A second sample-and-hold circuit 41, at whose input the output voltage VB is present, is firstly switched to sample. The output voltage VBS of the sample-and-hold circuit 41 therefore follows the voltage VB. The second circuit block 42 determines absolute value ABS(B) and sign SIGN(B) from the output voltage VBS. The sign SIGN(B) controls, via a switching device 25, for which of the digital delay elements 26S, 26T a delay time is set which is changed in accordance with the absolute value ABS(B) of the voltage VB or VBS. The voltage VB and thus the delay set for the delay element 26S or 26T therefore rise until the voltage TELP at the input of the integrator 39 becomes zero, that is to say the input voltage at the second window comparator 40 becomes smaller than the comparison voltage ±VRTE applied to the latter. This ensures that the offset voltage which is superposed on the track error signal DPD-TE is virtually zero. The last, that is to say optimum value of the voltage VB is then held in response to a corresponding signal S/H2 of the controller (not illustrated) to a corresponding signal NDT, as voltage VBS by the second sample-and-hold circuit 41. The adjustment is thus ended. The interference signal S is now switched off and the tracking regulator 17 is switched on. The voltages VAS and VBS are held until a new adjustment is initiated.

Figure 4:
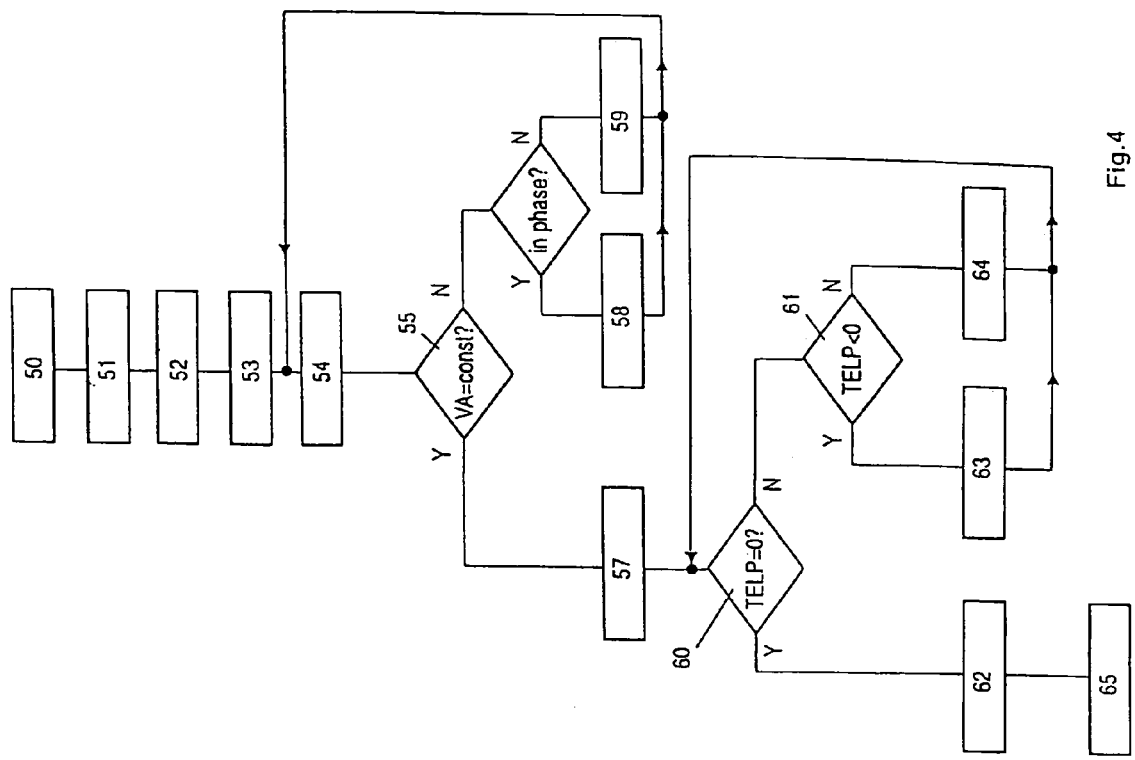
FIG. 4 shows a flow diagram of the method according to the invention.

FIG. 4 shows, by way of example, a flow diagram according to which adjustment of an apparatus according to the invention in the abovementioned steps can take place.

After the start of the method in step 50, in step 51 the tracking regulator 17 is switched off and the interference signal generating device 22 is switched on. As a result, the objective lens is wobbled in the manner described above. In step 52, the delay times $\tau_S$, $\tau_T$, $\tau_U$, $\tau_X$ and $\tau_Y$ of the delay elements 26S, 26T, 26U, 26X and 26Y are reset to an initial value, generally to zero. In order to form the track error signal DPD-TE, according to step 53 use is made of the time between the signals (A+C) and (B+D) which are output from the summation points 15 and 16, are formed from the output signals of the detector elements A, B, C and D, which output signals are routed via the delay elements 26X, 26Y and, for their part are delayed, if appropriate by delay element 26S, 26T, 26U. In step 54, the modulation of the track error signal DPD-TE which is caused by the interference signal S is detected with the aid of the synchronous demodulator 33. In step 55, branching to step 56 takes place if the differential sample-and-hold circuit DSH still detects changes in the signal VA, that is to say if VA≠const. If there is no longer a change in the signal VA, then the method branches to step 57.

In step 56, the direction of the change, that is to say the fact of whether the modulation of the track error signal DPD-TE is in phase or in antiphase with the interference signal S, determines whether the method branches to step 58 or to step 59. In step 58, the delay elements 26X and 26Y are assigned to the detector areas C and D and their delay time is increased. In step 59, the delay elements 26X, 26Y are assigned to the detector areas A, B and their delay times $\tau_X$ and $\tau_Y$, are increased. After steps 58 and 59, step 54 is carried out anew. This loop is passed through until the delay times that are set suffice to compensate for the modulation in the track error signal DPD-TE. In this case, the loop that has been described acts like an integration. If there is no longer a change in the output voltage VA of the synchronous demodulator 33, according to step 55 the method branches to step 57 and thus to the offset compensation. In the case of each reiteration of the loop during an adjustment operation, the branching of step 56 always takes place identically since the sign of VA does not change but rather only the absolute value of VA.

In step 57, the set values $\tau_X$, $\tau_Y$ are stored. In step 57, furthermore, the DC voltage offset is determined by means of the low-pass filter 27 and the second window comparator 40. If the DC voltage offset differs from zero, that is to say if TELP≠0, then the method branches to step 61. If the DC voltage offset is equal to zero within the bounds of predetermined limits, the comparison voltages ±VRTE in the exemplary embodiment, then the method branches to step 62. In step 61, the polarity of the DC voltage offset, that is to say the sign of the signal TELP, determines the signal of which of the detector elements is additionally delayed. If TELP<0, then the method branches to step 63, otherwise to step 64. In step 63, an additional delay of the delay element 26T is performed in that a value corresponding to the signal ABS(B) is set for the delay time $\tau_T$. In step 64, an additional delay of the delay element 26S is performed in that a value corresponding to the signal ABS(B) is set for the delay time $\tau_S$. After steps 63 and 64, step 60 is carried out anew. This loop is passed through until increasing the delay times of the delay elements 26S or 26T has caused the DC voltage offset to be smaller than the comparison voltage ±VRTE of the window comparator 40. Repeated traversal of this loop and simultaneous incrementation acts like an integration in this case.

According to step 62, the delay times $\tau_S$, $\tau_T$, $\tau_U$, $\tau_x$ and $\tau_y$ that have been determined and set are stored and held. These stored values are the optimal compensation values. The method is therefore ended in step 65.

Figure 5:
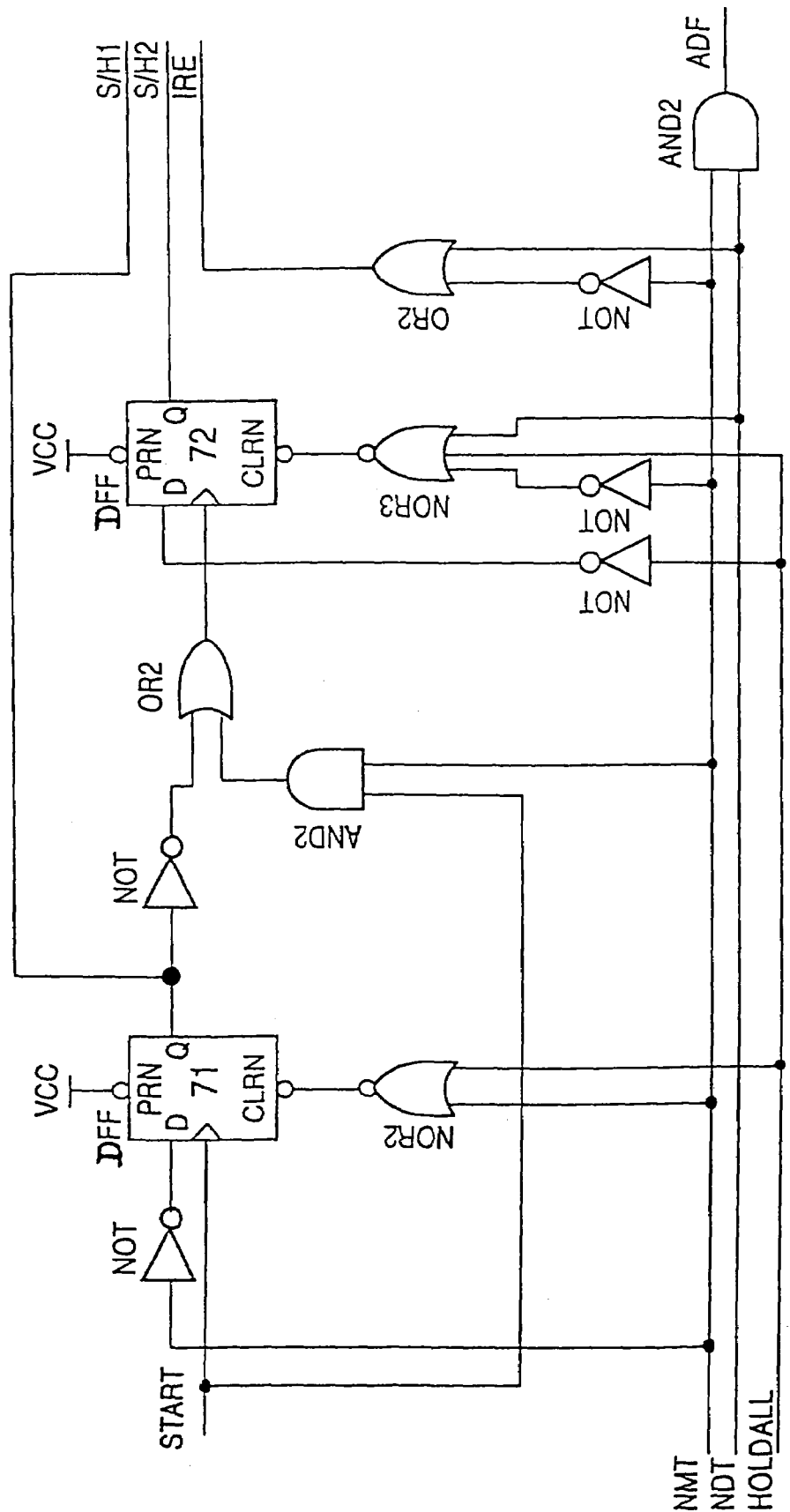
FIG. 5 shows logic control of an apparatus according to the invention.

The flow diagram represented in FIG. 4 can be realized for example by a logic control in accordance with FIG. 5 in connection with the block diagram of an apparatus according to the invention that is represented in FIG. 1. In this case, the logic AND gates are denoted by AND, the logic OR gates by OR and negation elements by N or NOT, and numerical details relate to the number of respective inputs. Separate reference symbols are assigned only when necessary.

As a result of the signal START, the adjustment operation is started and the objective lens 3 is wobbled. Since modulation of the track error signal DPD-TE is normally present on account of lens movement, the signal NMT is at the logic level "low", with the result that the signal edge of the signal START switches the first sample-and-hold circuit 35 to "sample" by means of the signal S/H1 output by the first digital flip-flop 71. The second digital flip-flop 72 is reset by NMT="low", and the reset signal IRE for the integrator 39 is maintained for the DC voltage offset compensation. The start pulse for the second digital flip-flop 72 is likewise suppressed. The activation of the first sample-and-hold circuit 35 makes it possible for the first adjustment step to proceed automatically, since the integrating component is already contained in the synchronous demodulator 33. The procedure of the first step ends when the voltage VA no longer changes with respect to time and, consequently, the voltage VD returns to the value zero.

The first adjustment step is automatically avoided if the signal NMT is at logic level "high" from the beginning, that is to say the modulation of the track error signal DPD-TE is sufficiently small even without any delay of the output signals of the detector elements A and B or C and D. The output NMT of the window comparator 34 switches to "high", as a result of which the first digital flip-flop 71 is reset and the second digital flip-flop 72 is set. At the same time, the sample-and-hold circuit 35 is switched to "hold" and the voltage VAS for compensation of the modulation of the track error signal DPD-TE is stored. At the same time, the sample-and-hold circuit 41 is switched to "sample" and the integrator 39 is enabled via the signal IRE="low". The second adjustment likewise proceeds automatically, owing to the integration, until the signal NDT assumes logic level "high".

As a result, the DC offset in the track error signal DPD-TE is also compensated for and the end of the adjustment is reached. If the DC offset is already equal to zero after the 1st adjustment step, then the signal NDT already assumes level "high" at this point in time and the second step is skipped. The signal ADF outwardly indicates that the adjustment has been successfully effected and both modulation and offset are zero or are below a predetermined limit value. With the aid of the signal HOLDALL both sample-and-hold circuits 35, 41 can forcibly be held in the state HOLD, in order to store the voltages for the delay elements 26.

Figure 6:
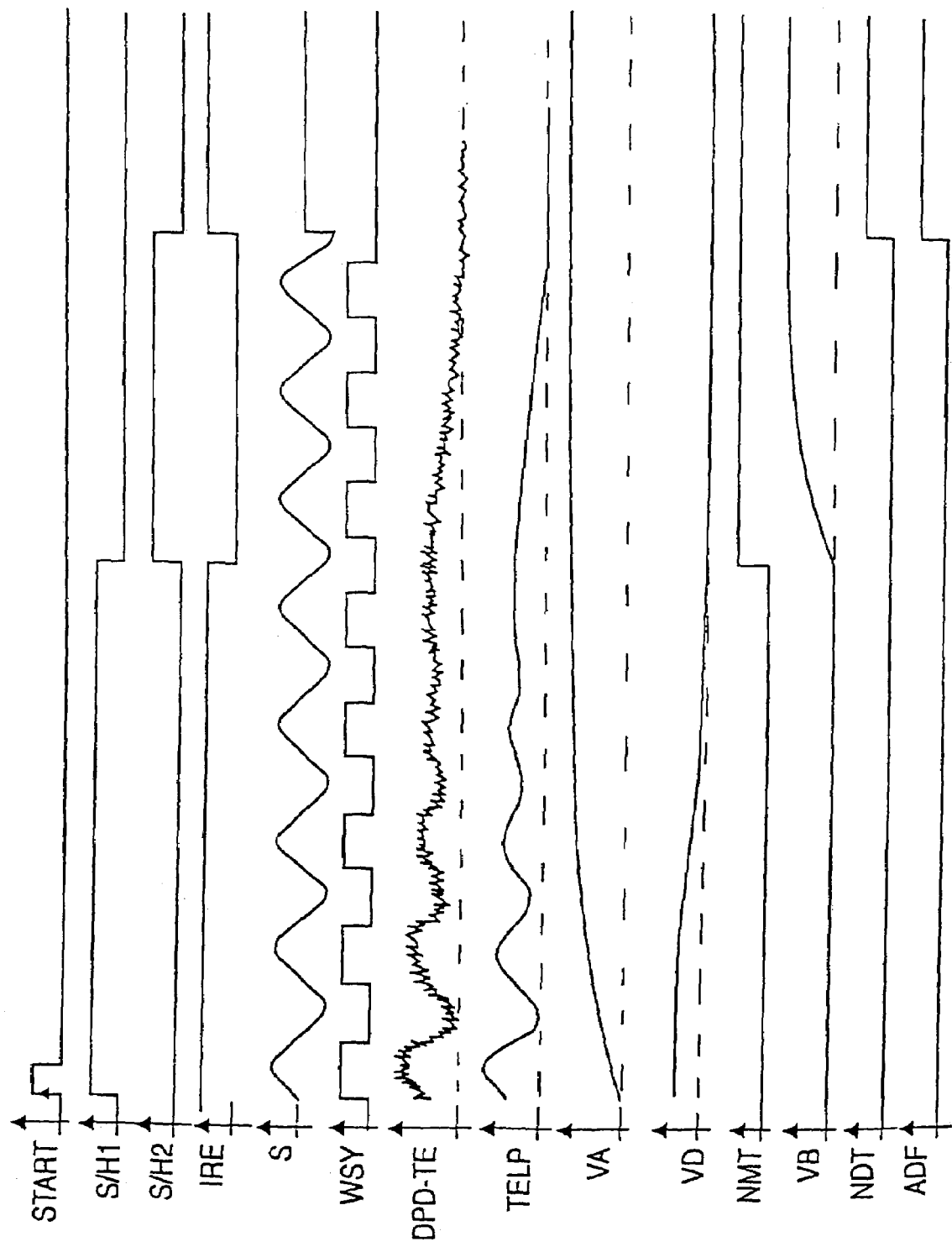
FIG. 6 shows a signal diagram relating to the method according to the invention.

The sequence of the adjustment in accordance with FIG. 5 is illustrated with the aid of a signal diagram in FIG. 6. The individual signals are designated in the same way as for FIGS. 1 and 5, and the time axis runs to the right. The phase shift between interference signal S and track error signal DPD-TE which is caused by vernier drive 6 and low-pass filter 21 is assumed to be zero for the sake of simplicity. The settling time of the two adjustment steps is also illustrated such that it is excessively short in comparison with the period of the wobbling frequency, for the sake of simplicity.

A simple realization of the control device 24, comprising offset determining device 44 as well as the comparison device 45, by means of analogue components is specified in FIG. 7. This representation corresponds to the right-hand part of FIG. 1 and is also provided with the corresponding reference symbols. The functioning of the circuit illustrated is evident from the description specified above; therefore, the individual components such as operational amplifiers, etc., will not be discussed in further detail here. In accordance with a further possible design (not illustrated here), a circuit for determining the difference between the upper and lower envelopes of the track error signal DPD-TE is provided instead of the low-pass filter 27. This difference is minimal in the ideal case.

In a further possible design which is likewise not illustrated here, a phase-independent synchronous rectifier with subsequent integration is provided instead of the phase shifter 23 and the synchronous demodulator 33. Even though the hardware is somewhat more complicated to realize in this case, this measure is recommended on account of the higher accuracy achieved thereby.

Since sample-and-hold circuits which operate with capacitors as charge stores cannot hold the voltage in a stable manner for a long time, on account of leakage currents, digitization of the values of the output voltages VA and VB and holding of the values at the digital level are provided as an advantageous development of the present invention. The voltages VAS and VBS are then in turn output after having been subjected to digital-to-analogue conversion. In this case, the separation into absolute value and sign also advantageously take places at the digital level.

It is particularly advantageous to integrate the entire sequence of the method, that is to say all of the circuit blocks in the right-hand part of FIG. 1 and the blocks of FIG. 7, in a microcontroller. This necessitates a low-pass filter 27 or, as an alternative thereto, an envelope detector, see above. The output voltage TELP thereof is digitized by the microcontroller. The analogue delay elements 26X, 26Y are controlled via digital-to-analogue converters or, advantageously, in a directly digital manner, and so too are the digital delay elements. Since, as a rule, the microcontroller controls the focus and track servo in any case, it can likewise undertake wobbling of the vernier drive 6 and comprise a phase-independent synchronous detector. This greatly minimizes the additional hardware outlay.

Figure 8:
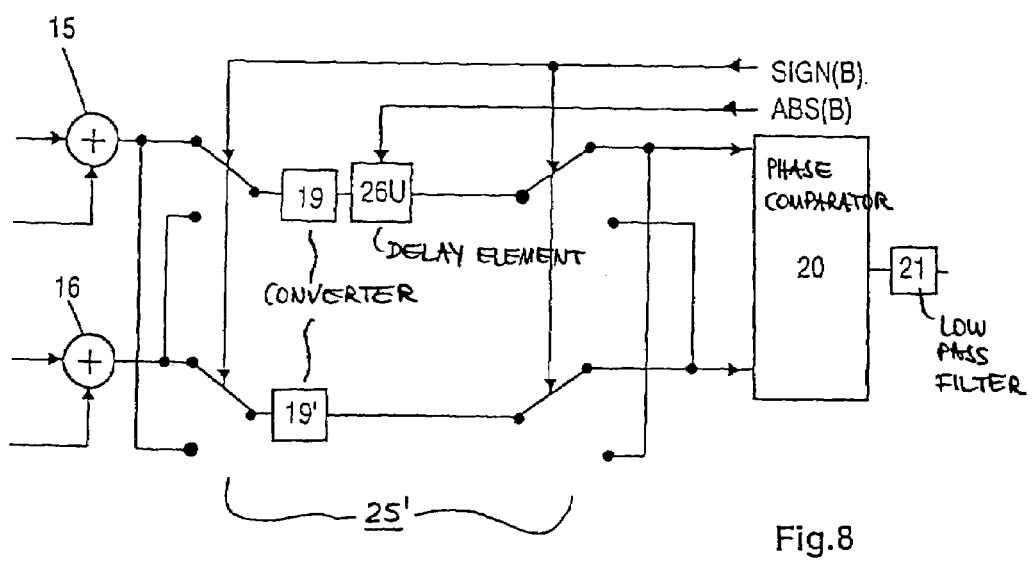
FIG. 8 shows part of an apparatus according to the invention in a further embodiment with one variable delay element for offset adjustment.

FIG. 8 shows part of an apparatus according to the invention of a further embodiment, which part serves for offset adjustment. This part may replace the corresponding part of FIG. 1 which is situated between the summation points 15, 16, on the one hand, and the phase comparator 20, on the other hand. Here, too, the already added signals A+C and C+D are delayed between the summation points 15 and 16, respectively, and the phase comparator 20. For this purpose, a variable digital delay element 26U, to which the signal. ABS(B) is applied, is inserted either into one or the other path by means of a switching device 25'. The switching device 25' switches in dependence on the signal SIGN(B). The two signals ABS(B) and SIGN(B) are derived, as described above, from the output signal VBS of the offset determining device 44. An advantage of this refinement is that only a single variable digital delay element 26U is required. A converter 19 is connected upstream of the variable digital delay, element 26U, while a converter 19' is arranged in the other signal path, which does not contain a variable delay element. The converters 19, 19' may either be connected downstream of the switching device 25', as illustrated, or be connected upstream thereof.

Figure 9:
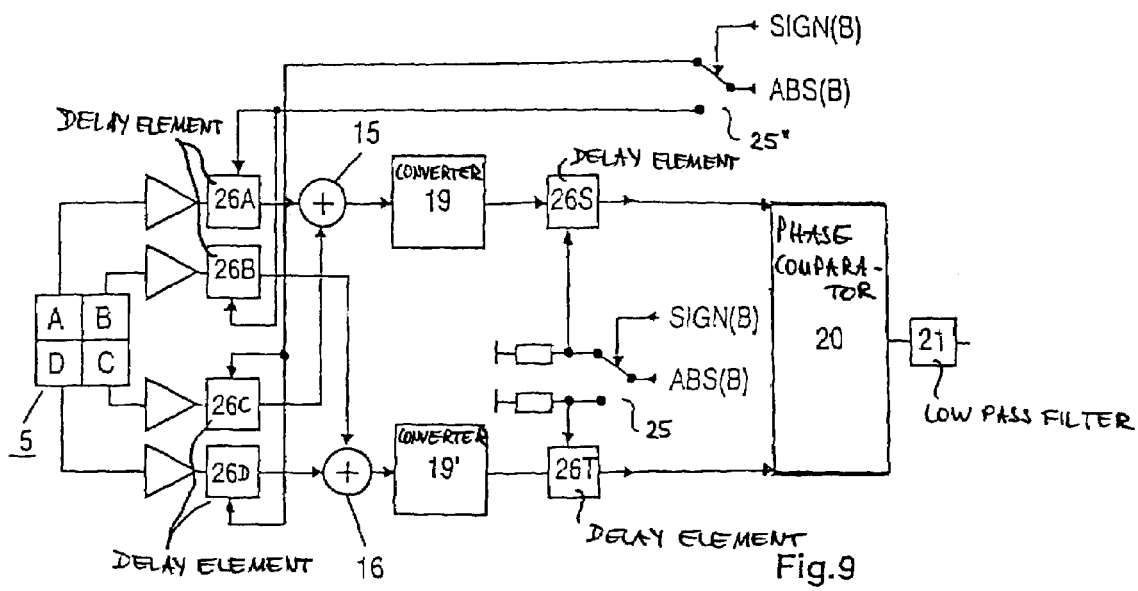
FIG. 9 shows part of an apparatus according to the invention in a further embodiment with a plurality of variable delay elements.

FIG. 9 shows part of an apparatus according to the invention, corresponding to that illustrated for FIG. 8, in a further embodiment. In this case, a variable analogue delay element 26A, 26B, 26C, 26D is assigned to each of the detector elements A, B, C, D and a variable digital delay element 26S, 26T is arranged downstream of each summation point 15, 16. A converter 19, 19' is situated between summation point 15, 16 and digital delay element 26S, 26T. A switching device 25 is controlled by the signal SIGN (B) and connects one of the digital delay elements 26S, 26T to the signal ABS(B). The signal ABS(A) is fed to the delay elements 26A, 26B or to the delay elements 26C and 26D via a switching device 25", which is switched by the signal SIGN(B). One advantage of this refinement is that switching devices 25, 25" of simpler construction can be used. The range of adjustment of the analogue delay elements 25A to 25D can be smaller, which reduces the complexity and thus the costs.

It goes without saying that practical combinations of the individual refinements illustrated here for compensating for the error caused by lens movement and for compensating for the offset are likewise within the scope of the invention, even if they are not described in detail here. Implementing the setting of the analogue and of the digital delay elements by means of method steps which are nested in one another is likewise within the scope of the invention.

What is claimed is:

1. Apparatus for reading from or writing to optical recording media, comprising:
   a tracking device,
   a four-quadrant detector,
   two summation points,
   a phase detector for tracking in accordance with a differential phase detection method, said phase detector comprising converters and a phase comparator, and
   variable delay elements that can be set by a control device, wherein
   at least one of said variable delay elements is a digital delay element for delaying only edges in an input signal which assumes just two states and at least one of said variable delay elements is an analog delay element for preserving both phase and amplitude information of its input signal, wherein
   at least one of said variable delay elements is arranged between one of said converters and said phase comparator and at least one of said variable delay elements is arranged between said four-quadrant detector and one of said summation points and, wherein none of the variable delay elements being a digital delay element is arranged between said four-quadrant detector and one of said converters.

2. Apparatus according to claim 1, wherein to each of the summation points one of the variable delay elements being a digital delay element for delaying only edges in an input signal which assumes just two states is assigned, and wherein a switching device is present for the purpose of connecting one of the digital delay elements assigned to the summation points to an output of an offset determining device.

3. Apparatus according to claim 1, wherein a switching device is present for the purpose of inserting a variable delay element being a digital delay element for delaying only edges in an input signal which assumes just two states between one of the summation points and the phase comparator.

4. Apparatus according to claim 1, wherein a switching device is present for connecting two of the detector elements of the four-quadrant detector to one variable delay element being an analog delay element for preserving both phase and amplitude information of its input signal, each.

5. Apparatus according to claim 1, wherein an interference signal generating device is present, whose output is connected to the tracking device and to a first input of the control device, whose second input is connected to the output of the phase comparator.

6. Apparatus according to claim 5, wherein the control device has a comparison device, at whose inputs the output signal of the phase comparator and the output signal of the interference signal generating device are present and whose output signal serves for setting at least one of the variable delay elements being an analog delay element for preserving both phase and amplitude information of its input signal.

7. Apparatus according to claim 1, wherein a control output of the control device, at which an output signal is present, is assigned a circuit block, which determines at least one of absolute value and sign of the signal present at the control output.

8. Apparatus according to claim 1, wherein a converter is connected between a variable delay element being a digital delay element for delaying only edges in an input signal which assumes just two states and one of the summation points.

9. Apparatus according to claim 1, wherein the control device and at least some of the variable delay elements are realized on an integrated circuit.

10. Apparatus according to claim 1, wherein the control device has an offset determining device, at whose input the output signal of the phase comparator is present and whose output signal serves for setting at least one of the variable delay elements being a digital delay element for delaying only edges in an input signal which assumes just two states.

11. Apparatus according to claim 10, wherein to each of the summation points one of the variable delay elements being a digital delay element for delaying only edges of an input signal which assumes just two states is assigned, and a switching device is present for the purpose of connecting one of the digital delay elements assigned to the summation points to the output of the offset determining device.

12. Apparatus according to claim 10, wherein a switching device is present for the purpose of inserting one of the variable delay elements being a digital delay element for delaying only edges in an input signal which assumes just two states between one of the summation points and the phase comparator.

13. Apparatus according to claim 10, wherein a switching device is present for connecting two of the detector elements of the four-quadrant detector to one variable delay element being an analog delay element for preserving both phase and amplitude information of its input signal, each.

14. Apparatus according to claim 10, wherein an interference signal generating device is present, whose output is connected to the tracking device and to a first input of the control device, whose second input is connected to the output of the phase comparator.

15. Apparatus according to claim 14, wherein the control device has a comparison device, at whose inputs the output signal of the phase comparator and the output signal of the interference signal generating device are present and whose output signal serves for setting at least one of the variable delay elements being an analog delay element for preserving both phase and amplitude information of its input signal.

16. Apparatus according to claim 10, wherein a control output of the control device, at which an output signal is present, is assigned a circuit block, which determines at least one of absolute value and sign of the signal present at the control output.

17. Apparatus according to claim 10, wherein a converter is connected between a variable delay element being a digital delay element for delaying only edges in an input signal which assumes just two states and one of the summation points.

18. Apparatus according to claim 10, wherein the control device and at least some of the variable delay elements are realized on an integrated circuit.

* * * * *